United States Patent
Gold et al.

[11] Patent Number: 5,785,390
[45] Date of Patent: Jul. 28, 1998

[54] VENTED HUBCAP

[75] Inventors: Mark N. Gold, Hallsville; Barry E. Braun; Paul S. Perry, both of Longview, all of Tex.

[73] Assignee: Stemco Inc., Longview, Tex.

[21] Appl. No.: 381,699

[22] Filed: Jan. 31, 1995

[51] Int. Cl.$^6$ ................................................ B60B 7/00
[52] U.S. Cl. ............................... 301/108.1; 301/108.4
[58] Field of Search ........................... 301/105.1, 108.1, 301/108.2, 108.3, 108.4; 384/462, 473; 184/5.1; 137/493.9, 512.4

[56] References Cited

U.S. PATENT DOCUMENTS

| | | | |
|---|---|---|---|
| 3,064,982 | 11/1962 | Stephens | 301/108.4 |
| 3,089,739 | 5/1963 | Steiner | 301/108.3 |
| 3,114,579 | 12/1963 | Isenbarger | 301/108.4 |
| 3,460,874 | 8/1969 | Johnson | 301/108.1 |
| 3,649,080 | 3/1972 | Molinare | 301/108.1 |
| 3,664,774 | 5/1972 | Tupper et al. | 417/560 |
| 4,073,540 | 2/1978 | Jackowski | 301/108.1 |
| 4,084,606 | 4/1978 | Mittleman | 137/102 |
| 4,190,133 | 2/1980 | Ploeger | 301/108.1 X |
| 5,192,117 | 3/1993 | Kuck | 301/108.1 |
| 5,482,358 | 1/1996 | Kuck | 301/108.1 |
| 5,492,393 | 2/1996 | Peisker et al. | 301/108.1 |

*Primary Examiner*—Russell D. Stormer
*Attorney, Agent, or Firm*—Cummings & Lockwood

[57] ABSTRACT

A hubcap attached to a wheel hub wherein a chamber is formed between the hubcap and the wheel hub for housing a lubricating fluid for the associated wheel bearings. A vent passage extending through the hubcap is provided for relieving the pressure formed therein. A porous material is positioned to cover the vent passage for allowing a flow of gases to enter and exit the vent passage while preventing liquids and other contaminants from traveling therethrough. The porous material is held in a compressive abutting relationship to the hubcap surface by an enclosure which surrounds the vent passage and encases the porous material to shield the outer surface of the porous material from exposure to external grit and other contaminants. The enclosure further has at least one port to accommodate air flow to the porous material. The enclosure may further include a filter device positioned adjacent to the port which prevents the passage of grit and other contaminants therethrough to prevent the accumulation of external contaminants on the porous material covering the vent passage thereby maintaining the air flow vent path.

13 Claims, 3 Drawing Sheets

VENTED HUBCAP

BACKGROUND OF THE INVENTION

1. Technical Field

The present invention relates to a hubcap and more particularly to a hubcap for use with automatic bearing lubrication systems.

2. Background Art

In translational and rotational devices generally and particularly on the wheels of most vehicles such as trucks and trailers, hubcaps are used to maintain oil or grease in the wheel bearings. In addition, hubcaps help exclude external contaminants and prevents them from coming into contact with the wheel bearings within the wheel hub cavity. External contaminants can substantially shorten the life of the wheel bearings. The interior of the wheel hub cavity is partially filled with oil or grease so that the wheel bearings are lubricated. Friction resulting from the rotating bearings heats the lubricant and the air space within the hubcap causing the enclosed lubricant and air to expand, thereby increasing ambient pressure in the cavity. The characteristic "pumping" action normally associated with the operation of the oil seals used with wheel bearings further tends to raise the ambient pressure. This increased pressure in the wheel hub cavity can become great enough to damage related components such as the oil seal, the seal between the hubcap and the wheel hub or even the hubcap itself. Damage to these components can cause leakage of lubricant from the wheel hub cavity and hubcap, resulting in insufficient bearing lubrication.

Accordingly, it has been desirable to incorporate a venting device in the hubcap to relieve the pressure developed within the wheel hub cavity. For example, U.S. Pat. Nos. 3,460,824 and 3,649,080 disclose movable valve elements positioned in a vent passage formed in the hubcap for permitting air to pass through the vent, in order to reduce internal pressure, while excluding passage of contaminants. However, these movable valve vent devices also permit lubricant flow out of the hubcap during venting, this results in excessive loss of lubricant over time. In addition, these devices are often unduly complicated because they utilize numerous parts and, therefore, are relatively expensive to manufacture.

U.S. Pat. Nos. 5,192,117 to Kuck and 3,320,006 to Cozzarin both disclose devices for venting a bearing housing while preventing the flow of lubricant from the bearing housing. The Kuck patent discloses a hubcap with a vent including a vent passage filled with a cylindrical gas permeable plug of bronze porous material which permits air to pass therethrough but assertedly prevents water and other contaminants from passing therethrough. The Cozzarin patent discloses a similar plug type vent device. Both the plug type vent devices of Kuck and Cozzarin appear to be secured in a vent passage formed in the hubcap via an interference or press fit which requires precision machining to ensure the low tolerances necessary for a secure fit. It is well known, however, that precision machining also results in increased manufacturing costs. Further, the outer surfaces of the prior art vent plugs are directly exposed to the outside work environment and therefore may become undesirably blocked by grit and other contaminants, severely hindering the venting action of the porous material.

U.S. Pat. No. 4,298,358 to Ruschke discloses a filter covering a venting passage in a housing which permits the passage of gas therethrough but is resistant to the passage of water, wherein the filter is located outside of the passage. Ruschke further discloses the filter being comprised of polytetrafluorethylene having a fibrous backing, such as the Reemay backing, manufactured by the W. L. Gore Company of Elkton, Md. U.S.A. Additionally, a valve structure surrounds the venting passage to allow gas to exit the housing while preventing external gas from entering the venting passage. The filter may be attached to the housing by heating the housing until it melts and flows between the fibers of the fibrous backing, or, alternatively, an adhesive tape may be placed around the edge of the filter attaching the filter to the housing. However, this venting device is specifically designed, and intended for use in administering fluid to living subjects and therefore not subject to the extreme temperature variations, pressure changes and vibrations experienced in the hubcap environment. The Ruschke structure is designed specifically to prevent external air from freely flowing back through the porous venting device when less than atmospheric pressure conditions exist within the housing. Accordingly, in a hubcap application, the Ruschke device would undesirably permit a high negative pressure to develop in the wheel hub cavity, thus subjecting the hubcap, the wheel and/or the seal to possible structural damage.

Therefore, as can be seen from the foregoing, there is a need for a hubcap with a vent which permits air to pass therethrough but which prevents the passage of water and other contaminants, wherein the venting device can be simply and inexpensively manufactured and secured to the hubcap.

SUMMARY OF THE INVENTION

It is a primary object of the present invention to overcome the aforementioned shortcomings associated with the prior art by providing a hubcap with a vent device which is simple to install, inexpensive to manufacture yet effective in operation.

Another object of the present invention is to provide a hubcap with a vent which prevents the loss of lubricant from within the wheel hub cavity so as to ensure that the wheel bearings remain lubricated at all times.

Yet another object of the present invention is to provide a hubcap having a venting structure to relieve the pressure developed within the wheel hub cavity while preventing water and other contaminants from entering the hub cavity.

It is also an object of the present invention to provide a hubcap with a vent formed of a porous material and affixed to the hubcap surface by an enclosure.

Another object of the present invention is to provide a vented hubcap for a wheel which maintains bidirectional air flow through the vent substantially free from blockage by contaminants that might be caused by operation of the wheel.

It is still another object of the present invention to provide a hubcap with a vent formed of porous material which includes an enclosure encasing the porous material in order to shield the porous material from grit and other contaminants.

Yet another object of the present invention is to provide a hubcap with a vent formed of a porous material which includes a filter device for preventing grit and other contaminants from reaching the porous vent from the outside environment.

A still further object of the present invention is to provide a hubcap with a porous material vent having oblique radial vanes formed interiorly within the hubcap to prevent oil and oil vapor from impinging on the interior surface of the vent.

These as well as additional objects and advantages of the present invention are achieved by providing a hubcap attached to a wheel wherein a chamber is defined by the hubcap and the wheel hub cavity for housing a lubricating fluid for the associated wheel bearings. A passage extending through the hubcap is provided for equalizing the pressure between the wheel hub cavity and the outside environment. The passage is covered by a porous material which allows a bidirectional flow of gases through the passage while preventing liquids and other contaminants from traveling therethrough, wherein the porous material covering the vent passage may be comprised of a non-metallic material. An enclosure encases the porous material in order to shield the porous material from external contaminants thereby preventing blockage of the vent passage due to the accumulation of grit and other contaminants on the porous material. The enclosure further has at least one port to accommodate air flow to the porous material. A filter may also be located in the enclosure to prevent external contaminants from entering the enclosure through the port thereby ensuring an unrestricted air flow path through the port and porous material.

DETAILED DESCRIPTION OF A PREFERRED EMBODIMENT

Figure 1:
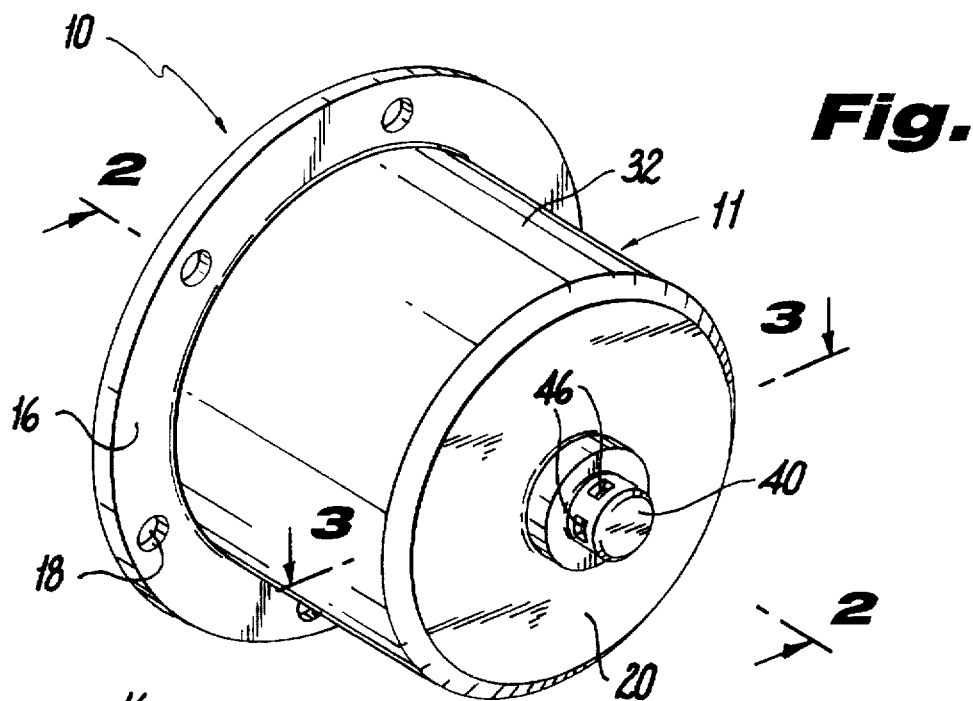
FIG. 1 is a perspective view of the vented hubcap of the present invention.
Figure 2:
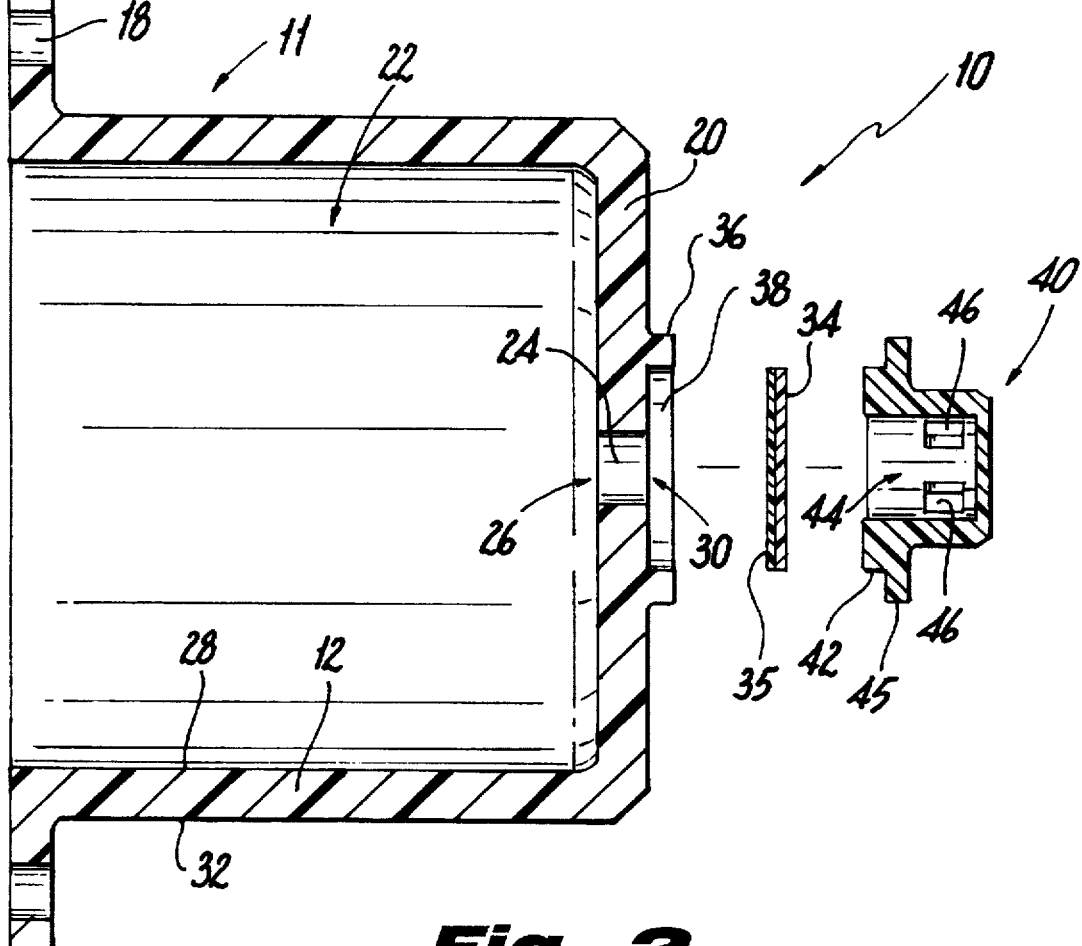
FIG. 2 is a sectional view of the hubcap taken generally along plane II—II of FIG. 1.

Referring now to FIGS. 1 and 2, the vented hubcap 10 of the present invention is illustrated for conventional use, for example, on a vehicle, such as a tractor or a trailer, having wheels which are each rotatably connected to an end of an axle via bearings. Vented hubcap 10 mounts onto a wheel hub and functions to contain lubricant for lubricating the bearings during operation of the wheel and bearings while venting the wheel hub cavity to atmosphere. This avoids damage to the wheel seal that might be caused by excessive positive and/or negative pressure in the wheel hub cavity. In addition, vented hubcap 20 prevents external contaminants such as grit and water from entering the wheel hub cavity and from blocking the vent flow path.

As shown in FIGS. 1 and 2, the hubcap body 11 includes a sidewall 12 which is generally cylindrical in shape and includes a mounting flange 16 at one end having apertures 18 for receiving bolts or the like which secure the hubcap 10 to the wheel hub. The opposite end of hubcap 10 is closed by an end wall 20 extending radially inward to form a chamber 22 for housing lubrication fluid in cooepration with a wheel hub. Once the hubcap 10 is mounted, the open end of chamber 22 is closed in effect, to sealingly retain the lubricating fluid in operative relationship with the wheel bearings.

Hubcap 10 also includes a vent passage 24 extending through end wall 20 to form an inner opening 26 in an inner surface 28 of hubcap 10 and an outer opening 30 in an outer surface 32 of the hubcap. The vent passage 24 functions to equalize the pressure between the chamber 22 and atmospheric conditions outside hubcap 10. In the preferred embodiment, vent passage 24 extends through, and is centrally positioned in, end wall 20.

In order to prevent the lubricant contained within chamber 22 from escaping through vent passage 24, a flexible porous sheet 34 is positioned across outer opening 30 of vent passage 24 adjacent outer surface 32. The porous sheet 34 includes pores or interstices of a size sufficient to prevent the flow of liquids, such as lubricant and water, therethrough while permitting the flow of gases therethrough. The porous sheet 34 is oleophobic, and correspondingly hydrophobic, and functions to contain the lubricant within chamber 22 while allowing air to pass to and from chamber 22 through vent passage 24. To achieve this function, the porous sheet 34 is preferably comprised of a non-metallic material, such as a porous, expanded membrane of polytetrafluoroethylene (PTFE) in the form of a disc having a pore size in the microporous size range, referred to as Gore-Tex® manufactured by W. L. Gore & Associates, Inc., of Elkton, Md. Such membranes have a pore size in the 0.045 micron size range or smaller, and maintain a watertight seal while permitting an enclosure to "breathe". The membrane is also preferably provided with an oil repellant coating or treatment to render the membrane oleophobic. Such PTFE membranes are often too fragile and flexible for unsupported use in a hubcap environment, and therefore a backing sheet 35 formed of polypropylene or a fibrous material is bonded to the membrane to provide added support. The backing sheet 35 is formed to cover at least the portion of the sheet 34 over the vent opening 30 which is unsupported by the surface 32, and in some cases, may be sandwiched between two porous sheets 34. Porous sheet 34 may alternatively be positioned over inner opening 26 of vent passage 24 adjacent inner surface 28.

Figure 3:
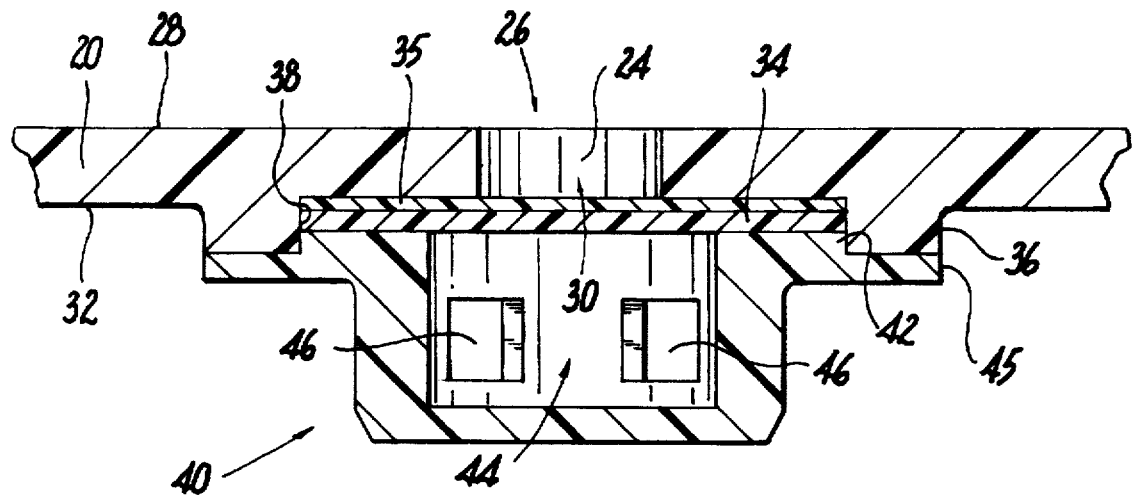
FIG. 3 is an enlarged sectional view of the enclosure cap for the vented hubcap of FIG. 2 taken generally along plane III—III of FIG. 1.

Referring now to FIGS. 2 and 3, the mounting of porous sheet 34 to hubcap 10 will be set forth in greater detail. Hubcap 10 includes an annular protrusion 36 extending outwardly from outer surface 32 of end wall 20 to form a recess 38 for receiving the porous sheet 34 and backing sheet 35. Annular protrusion 36 prevents lateral movement of the porous sheet 34 with respect to outer surface 32 thereby retaining the porous sheet 34 within recess 38 during assembly. It should be noted that a circular depression could be formed in outer surface 32 which would perform the same function as annular protrusion 36. Porous sheet 34 is secured against outer surface 32 in recess 38 by an enclosure cap 40 which presses the porous sheet 34 against outer surface 32.

Enclosure cap 40 includes an axial extension 42 for positioning in recess 38 and an enclosed cavity 44 for communication with vent passage 24. Enclosure cap 40 further includes an annular flange 45 which extends radially outward from axial extension 42 for abutting the upper outer surface of annular protrusion 36 when enclosure cap 40 is positioned against outer surface 32 of hubcap 10. Enclosure 40 is preferably temporarily secured to hubcap 10 during assembly by, for example, a snapfit connection between axial extension 42 with recess 38 and flange 45 with the top surface of annular protrusion 36. Such a connection allows the enclosure to be held in place until it can later be sealed against outer surface 32 by, for example, ultrasonically welding flange 45 to annular protrusion 36. To seal enclosure cap 40 against annular protrusion 36 utilizing ultrasonic welding, the cap 40 and endwall 20 including the protrusion 36 are formed of a plastic material susceptible to ultrasonic welding such as polycarbonate. Ultrasonic welding is particularly advantageous in providing a bond sufficient enough to withstand the extreme road conditions such as intense vibration and thermal gradients, so as to retain porous sheet 34 in a compressive abutting relationship between the enclosure cap 40 and end wall 20 over outer opening 30 throughout the operation of the wheel.

Enclosure cap 40 further includes at least one port 46 which extends radially from cavity 44 through enclosure cap 40 to connect cavity 44 to the atmosphere, thus providing an air flow path to and from the chamber 22 through passage 24 to porous sheet 34. In the preferred embodiment, the enclosure cap includes a series of ports equally spaced around the peripheral extent of enclosure cap. Thus, the enclosure cap is designed to relieve pressure within the wheel hub cavity and hubcap by allowing air flow therethrough, while shielding porous sheet 34 from exposure to grit and other external contaminants which could accumulate on porous sheet 34 and undesirably bloc the air flow path. The enclosure may also utilize an O-ring or suitable gasket between the enclosure cap and the outer surface 32 of the hubcap in order to prevent leakage between the enclosure cap and its mount.

Figure 4:
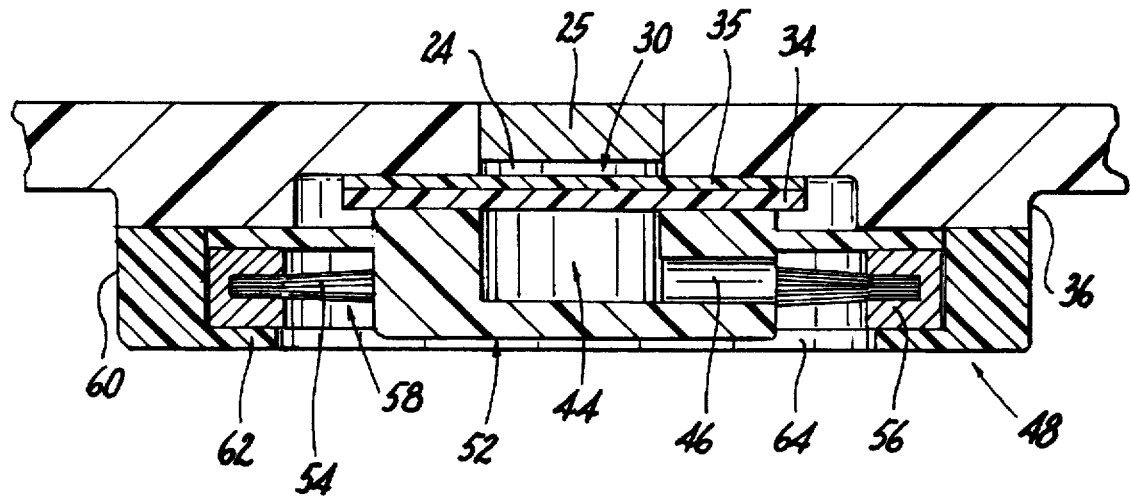
FIG. 4 is a sectional view of a second embodiment of the vented hubcap of the present invention.

Referring now to FIG. 4, an alternative embodiment of the hubcap 10 of the present invention is illustrated wherein an enclosure cap 48 includes a filter device 50 for preventing particulate contaminants from reaching the porous sheet 34. Enclosure cap 48 cooperates with a cylindrical inner retainer 52, similar in shape and function to the enclosure 40 of the previous embodiment, for securely fastening porous sheet 34 in place over outer opening 30 while shielding porous sheet 34 from exposure to contaminants. The filter device 50 includes an annular brush element 54, which may be formed of nylon bristles, and which is attached to a support ring 56 positioned around the outer periphery of inner retainer 52 to form an annular cavity 58 therebetween. The annular cavity 58 is in gaseous communication with the port 46 and the environment outside of the hubcap 10. The brush element 54 is positioned to cover the entrance of all ports 46 which may be formed in the inner retainer 52 so that all foreign substances entering annular cavity 58 will be captured or deflected by filter device 50. Brush element 54 may be shaped in an annular ring so that it extends throughout the entire circumference of the annular cavity 58, or, alternatively, brush element 54 may be positioned in annular cavity 58 only in the vicinity of the ports 46. The filter device 50 may be comprised of any material capable of filtering out grit and other contaminants from the air passing therethrough while maintaining sufficient air flow. An annular filter retainer 60 is positioned around support ring 56 and includes a rim 62 which extends over support ring 56. Filter retainer 60 is secured to a portion of the surface of the annular protrusion 36 causing rim 62 to abut and securely fasten support ring 56 in position. The annular filter retainer 60 may be secured to the annular protrusion 36 using ultrasonic welding, or other comparable techniques to thereby capture support ring 56 including brush element 54, together with the flange of inner retainer 52, and to compress them together to seal against leakage. An annular opening 64 is formed radially between rim 62 and the outer end of inner retainer 52 to provide an air flow path between annular cavity 58 and the atmosphere. Annular opening 64 also permits easy access t the bristles of brush element 54 without disassembling the filter device to permit quick and effective cleaning and removal of accumulated grit and other contaminants.

The enclosure device of the hubcap of the present invention effectively shields the porous venting sheet 34 from contaminants such as grit. The accumulation of grit on the surface of the porous sheet 34 could reduce its permeability thus impairing its ability to vent the hubcap while possibly requiring frequent replacement of the porous sheet 34. Therefore, the enclosure of the present invention is useful in extending the duration for which the porous sheet 34 remains permeable to air.

As further illustrated in FIG. 4, the vent passage 24 of the present invention may also include a porous metal plug 25 positioned therein. The metal plug 25 which is preferably formed of sintered stainless steel, is secured in place in the passage 24 trough the use of an interference fit between the plug and passage wall. The porous metal plug 25 retains oil or grease within the hubcap chamber 22 while permitting air to pass through the vent passage 24 to reduce internal pressure in the chamber 22. Therefore, the porous metal plug 25 serves the same function as porous sheet 34 in venting the pressure within the chamber 22 while retaining fluid therein. However, it has been found that conventional untreated porous metal plugs, such as metal plug 25, undesirably permit moisture to travel therethrough when the pressure differential across the plug becomes sufficiently large. Moisture leakage through the plug may be alleviated by coating the plug with PTFE. However, porous sheet 34 of the vent assembly of the present invention avoids the need for PTFE coating on the plug by continuing to prevent moisture from passing through its pores, even at large pressure differentials. Accordingly, the combination of porous sheet 34 and porous metal plug 25 is especially effective in preventing external contaminants from entering chamber 22 through vent passage 24. Furthermore, metal plug 25 will prevent the oil or grease within chamber 22 from contacting and accumulating on the surface of porous sheet 34 which could affect the permeability to air of porous sheet 34. While porous metal plug 25 is illustrated in FIG. 4, it may also be utilized in conjunction with the embodiment discussed above and shown in FIG. 3.

Figure 5:
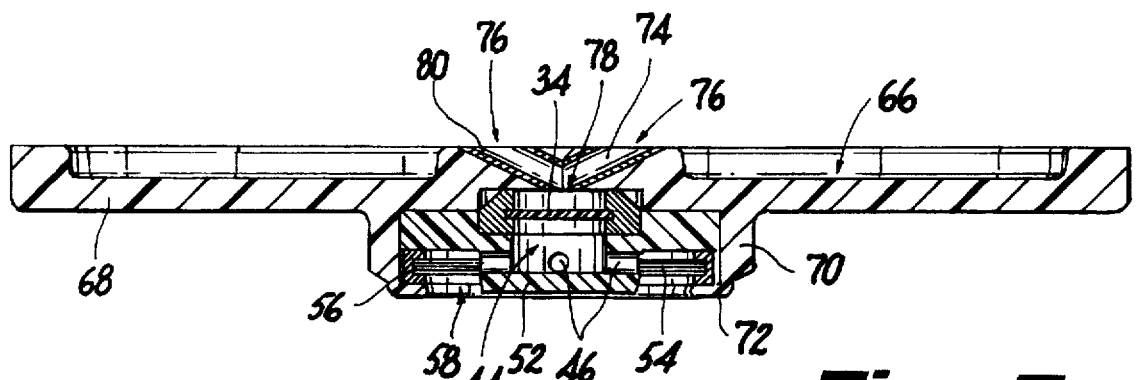
FIG. 5 is a sectional view of a third embodiment of the vented hubcap of the present invention.

Referring now to FIG. 5, a vented hubcap window 66 is disclosed which incorporates many of the structural features of the hubcap of FIG. 4, but in this case, the hubcap is formed with a unitary body 68 having an upstanding circular wall 70 including an outermost rim 72; rim 72, which may be formed by crimping, extends over the support ring 56 for the brush element 54. The wall 70 defines the cavity 44 in which the porous sheet 34 is mounted.

Beneath the cavity 44, the hubcap body 68 is formed to provide obliquely extending radial passages 74 which open at ends 76 into the interior of the hubcap. Internally, the passages 74 terminate at an opening 78 positioned beneath the porous sheet 34. Each of the radially extending passages 74 is lined with a metal lining 80, and there may be, as an example, four passages 74 spaced at 90° intervals in the area of the open ends 76, all of which terminate at the opening 78.

The passages 74 operate in combination with the porous sheet 34 to permit air from within the hubcap to pass along the passages and through the opening 78 and the porous sheet 34 to the exterior of the hubcap. However, the oblique passages restrict oil and oil vapor from coating the underside of the porous sheet 34 thereby blocking the passage of air. Any oil which would tend to enter one of the passages 74 is dispelled therefrom by centrifugal force as the hubcap rotates thereby preventing the oil from passing through the opening 78 and reaching the porous sheet 34. Oil vapor contacts the metal lining 80 and condenses, to be subsequently dispelled from a passage 74 along with any particles that were suspended in the vapor, by centrifugal force.

Figure 6:
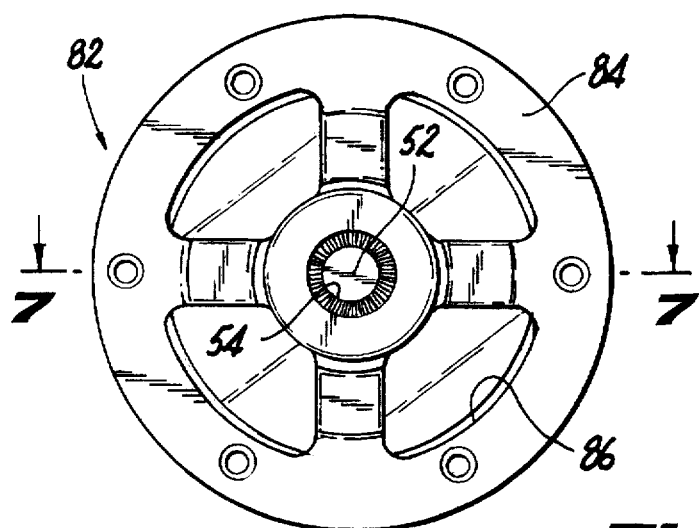
FIG. 6 is a plan view of a fourth embodiment of the vented hubcap of the present invention.
Figure 7:
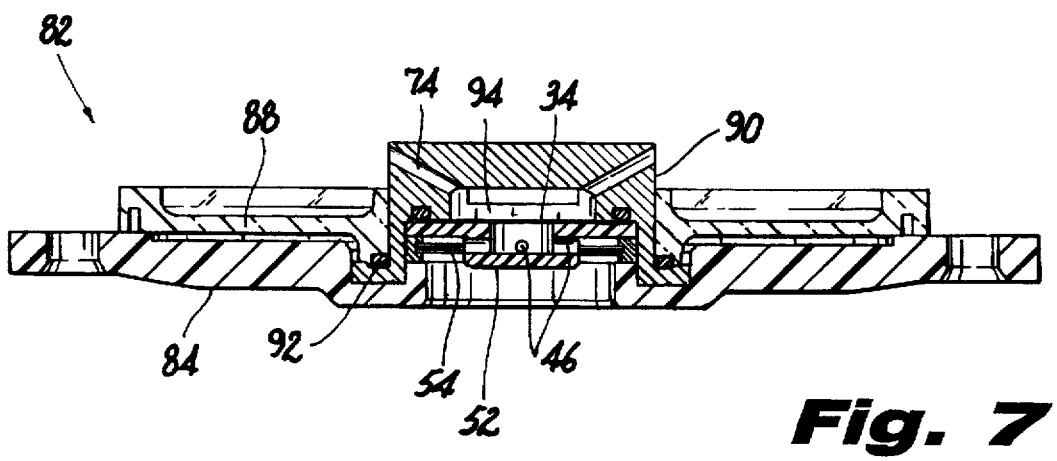
FIG. 7 is a sectional view of the vented hubcap of FIG. 6.

FIGS. 6 and 7 disclose a hubcap 82 which is a modification of the hubcap 66. Hubcap 82 includes a metallic body 84 made of metal, such as aluminum or magnesium, in which the brush 54 is captured. The body 84 is provided with openings 86 which permit the interior of the hub cavity to be viewed through window assembly 88. The window assembly 88 is formed of transparent plastic material which is secured to hubcap body 84. A separate vent body 90 containing the channels 74 is captured between window assembly 88 and body 84, and is sealed to the window assembly by an O-ring seal 92. Vent body 90 defines a channel area 94 beneath the porous sheet 34 which connects the oblique channel 74 with the area beneath the porous sheet. The vent body is formed from a block of metal, such as aluminum, which due to its mass and its thermal conductivity, remains cooler than the oil within the hubcap. Thus, when the hot oil vapor contacts this relatively cooler metal mass, it condenses and is ejected from the central area through channel 74 by centrifugal force.

The hubcap 82 operates in a manner similar to that previously described with respect to the hubcap 66 wherein air from within the hubcap passes through the porous sheet 34 and the brush 54 to the exterior. However, the channel 74 in combination with centrifugal force resulting from rotation of the wheel prevents lubricant from coating the internal surface of the porous sheet.

As can be seen from the foregoing, a hubcap formed in accordance with the present invention will relieve pressure developed within the wheel hub cavity, by venting, while preventing water and other contaminants from entering the hubcap and contacting the wheel bearings. This will extend, effectively, the useful life of the lubricant and bearings. Moreover, by forming the hubcap in accordance with the present invention, an enclosure is provided which is useful in preventing grit and other contaminants from accumulating on the surface of the venting structure thereby maintaining the air flow vent path and ensuring proper venting of the hubcap. Additionally, a hubcap formed in accordance with the present invention will enable materials to be used for venting which do not need to rely upon an interference fit within the vent passage thereby resulting in a simple, inexpensive yet effective vented hubcap.

What is claimed is:

1. A hubcap for covering lubricated wheel bearings in a wheel hub comprising:

a hubcap body member attachable to the wheel hub for enclosing the wheel bearings, said hubcap member defining a closed chamber between said hubcap body member and the wheel hub for housing a fluid for lubricating the wheel bearings;

a vent means for permitting gases to flow from said chamber, said vent means including a vent passage extending through said hubcap body member and a thin sheet of porous material supported on said hubcap body member for allowing a flow of gases to enter and exit said chamber through said vent passage while preventing liquids and other contaminants from flowing into said chamber and lubricant from flowing out of said chamber; and a fastening means attached to said hubcap body member and covering said sheet of porous material, said fastening means including means for securing said sheet of porous material in position over said vent passage, said sheet of porous material being positioned between said fastening means and said vent passage, said fastening means defining a central cavity located adjacent said sheet of porous material and at least one port extending from said central cavity to connect said central cavity to the atmosphere.

2. The hubcap as defined in claim 1, wherein said sheet of porous material includes an outer surface exposed to external contaminants, said central cavity operating to shield said outer surface from exposure to the external contaminants, said port extending radially from said central cavity to accommodate air flow to and from said central cavity and porous sheet of material.

3. The hubcap as defined in claim 2, wherein said central cavity is in gaseous communication with said port and in gaseous communication with said vent passage by way of said sheet of porous material, and said means for securing said sheet of porous material includes an axial projection for abutment against said porous material.

4. The hubcap as defined in claim 3, wherein said fastening means is ultrasonically welded to said hubcap body member to securely position said sheet of porous material in compressive abutting relationship between said axial projection and said hubcap body member.

5. The hubcap as defined in claim 2, further including a filtering means connected to said hubcap body for preventing the passage of grit and other contaminants through said port to thereby prevent the accumulation of external contaminants on said porous material.

6. The hubcap as defined in claim 5, wherein said filtering means includes a brush.

7. The hubcap as defined in claim 6, wherein said fastening means includes a plurality of ports to said central chamber to facilitate air flow to and from said porous material, said filtering means being positioned adjacent said plurality of ports such that air flow through said plurality of ports must pass through said filtering means.

8. The hubcap as defined in claim 5, wherein said sheet of porous material is an expanded membrane of polytetrafluoroethylene with a pore size in the microporous range, said membrane being treated to render the membrane oleophobic.

9. A hubcap for covering lubricated wheel bearings in a wheel hub comprising:

a hubcap body member attachable to the wheel hub for enclosing the wheel bearings, said hubcap member defining a closed chamber between said hubcap body member and the wheel hub for housing a fluid for lubricating the wheel bearings;

a vent means for permitting gases to flow from said chamber, said vent means including a vent passage extending through said hubcap body member and a thin sheet of porous material supported on said hubcap body member for allowing a flow of gases to enter and exit said chamber through said vent passage while preventing liquids and other contaminants from flowing into said chamber and lubricant from flowing out of said chamber, said sheet of porous material including an outer surface exposed to external contaminants;

a fastening means attached to said hubcap body member and covering said sheet of porous material, said fastening means including means for securing said sheet of porous material in position over said vent passage, said sheet of porous material being positioned between said fastening means and said vent passage, said fastening means defining a central cavity located adjacent said outer surface of said sheet of porous material and at least one port extending radially from said central cavity to connect said central cavity to the atmosphere, said central cavity operating to shield said outer surface of said sheet of porous material from exposure to the external contaminants; and filtering means connected to said hubcap body for preventing the passage of contaminants through said port to thereby prevent the accumulation of such contaminants on said sheet of porous material.

10. The hubcap as defined in claim 9, wherein said sheet of porous material is an expanded membrane of polyterafluoroethylene with a pore size in the microproous range.

11. The hubcap as defined in claim 10, wherein said membrane is treated in such a manner so as to render said membrane oleophobic.

12. The hubcap as defined in claim 9, wherein said fastening means is ultrasonically welded to said hubcap body member to secure said sheet of porous material in position over said vent passage.

13. The hubcap as defined in claim 9, wherein said filtering means includes a brush.

* * * * *